United States Patent Office 2,863,842
Patented Dec. 9, 1958

2,863,842

PROCESS FOR THE PREPARATION OF SULFITE MODIFIED MELAMINE-FORMALDEHYDE RESIN AND PRODUCT OBTAINED

Francis A. Bonzagni, Springfield, Mass., assignor to Monsanto Chemical Company, St. Louis, Mo., a corporation of Delaware No Drawing. Application May 23, 1956
Serial No. 586,655

8 Claims. (Cl. 260—29.4)

The present invention relates to chemically-modified, melamine-formaldehyde resins and to methods for the preparation thereof. This invention additionally relates to cationic resins prepared from such chemically-modified, melamine-formaldehyde resins.

The melamine-formaldehyde resins constitute a valuable member of the generic class of thermosetting resins known in the art as aminoplasts. In many of the applications of the aminoplasts, e. g., in water-base adhesives, it is essential that the aminoplast has a high viscosity and be either water-soluble or water-dispersible. To date the art has been unable to employ melamine-formaldehyde resins in such applications, since to this date it has not been possible to prepare water-soluble or water-dispersible melamine-formaldehyde resins of high viscosity. Attempts have been made to improve the water-solubility of high viscosity melamine-formaldehyde resins by reacting such resins with lower aliphatic alcohols or sulfurous acid. While it is possible to water-solubilize high viscosity melamine-formaldehyde resins by such techniques, the quantity of modifying agent that must be employed is so large as to adversely affect many of the desirable properties of the resin. Accordingly, it would be desirable to have available high viscosity, water-soluble, melamine-formaldehyde resins whose properties were in general similar to those of the presently available high viscosity, water-insoluble melamine-formaldehyde resins.

The melamine-formaldehyde resins find wide application in the preparation of high wet tensile strength paper. While the presently available resins of this type have good properties for this application, it would be desirable to have modified melamine-formaldehyde resins of still better properties.

It is an object of this invention to provide improved melamine-formaldehyde resins.

Another object of this invention is to provide improved water-soluble melamine-formaldehyde resins which have high viscosities.

Yet another object of this invention is to provide improved melamine-formaldehyde resins which impart high wet tensile strength to paper when deposited on the cellulosic fibers thereof.

It has been discovered that water-soluble melamine-formaldehyde resins having high viscosities can be prepared by reacting melamine with closely controlled quantities of formaldehyde and water-soluble salts of sulfurous acid under certain critical reaction conditions. Such resins are prepared by reacting 1 molar proportion of melamine with 3.0–4.0 molar proportions of formaldehyde and 0.10–0.20 molar proportion of a water-soluble salt of sulfurous acid in an aqueous solution at a pH of at least 8.5 and preferably 9.0 until the resulting sulfite-modified, melamine-formaldehyde resin has a viscosity of at least 300 centipoises when measured in a 55% aqueous solution at 25° C. Such sulfite-modified, melamine-formaldehyde resins, by treatment with strong acid solutions, can be converted into cationic resins having extremely valuable properties, particularly when employed as wet strength resins in the manufacture of paper.

The following examples are set forth to illustrate more clearly the principle and practice of this invention to those skilled in the art. All parts are by weight.

EXAMPLE I

A sulfite-modified, melamine-formaldehyde resin is prepared by reacting together 1 molar proportion of melamine, 3.6 molar proportions of formaldehyde (charged as a 37% formalin solution) and 0.17 molar proportion of sodium bisulfite. After mixing the reactants together and adjusting the pH of the solution to 9.5 with sodium hydroxide, the reaction mixture is heated for 5 hours at a temperature of 95–100° C. The pH of the reaction mixture is followed and sodium hydroxide is added throughout the reaction period as required to maintain the pH between 9.0 and 9.5. The resin is recovered as a 55% aqueous solution which has a viscosity of 1500 centipoises at 25° C. Throughout this description, whenever resin viscosities are mentioned, it will be understood that the reported value is the viscosity of a 55% aqueous solution of the resin at 25° C.

The resin is infinitely dilutable with water and can be stored for 3–4 days at 75° F. before incipient gelling occurs. When spray-dried, the resin can be stored for periods of up to 1 year at 65–80° F. Without adversely affecting the water-solubility of the resin.

EXAMPLE II

The sulfite-modified, melamine-formaldehyde resins of this invention have unusual and desirable viscosity properties. To illustrate this fact, two formulated plywood adhesive compositions are prepared. Each adhesive composition consists of 24 parts of a urea-formaldehyde resin, 40 parts of a melamine-formaldehyde resin, 20 parts of pecan shell flour and 100 parts of water. The only difference between the formulations is that one formulation contains a prior art low viscosity, spray-dried, water-soluble melamine-formaldehyde resin, whereas the other formulation contains the spray-dried, sulfite-modified, melamine-formaldehyde resin of Example I.

The adhesive formulation containing the prior art melamine-formaldehyde resin has a viscosity of about 60 centipoises at 75° F., whereas the formulation containing the sulfite-modified, melamine-formaldehyde resin of Example I has a viscosity of about 1500 centipoises at 75° F. When plywood is prepared employing these two adhesive formulations, superior bonds are obtained with the formulation containing the sulfite-modified, melamine-formaldehyde resin of Example I.

EXAMPLE III

To further illustrate the outstanding viscosity characteristics of the sulfite-modified, melamine-formaldehyde resins of this invention a high solids aqueous solution of a binary mixture of a urea-formaldehyde resin and the sulfite-modified, melamine-formaldehyde resin of Example I is prepared. This binary solution is prepared by first making a 60% solids aqueous solution of the resin of Example I and adding 10 parts of this solution to 90 parts of a 60% solids aqueous solution of a urea-formaldehyde resin which has a viscosity of 550 centipoises of 75° C. The viscosity of the resulting binary resin solution is 590 centipoises at 75° C. By way of comparison a similar binary resin solution is prepared except that a prior art, water-soluble, melamine-formaldehyde resin is employed in lieu of the resin of Example I. In all other respects the composition is identical to that described in the paragraph above. The resulting binary resin composition has a viscosity of only 240 centipoises at 75° C.

EXAMPLE IV

The water-solubilities of the sulfite-modified, melamine-formaldehyde resins of this invention are an unusual function of the resin viscosity. The resins are water-soluble until their viscosities exceed 100 centipoises, at which point they become water-insoluble. The resins remain water-insoluble as their viscosities are increased until a viscosity of approximately 300 centipoises is reached, at which viscosity a solubility inversion takes place and thereafter the resins become progressively more water-soluble as their viscosities are increased. The resins remain water-soluble at viscosities of up to at least 7000 centipoises.

To illustrate this phenomenon, Example I is repeated except that the reaction mixture is heated at 95–100° C. until the resin has a viscosity of 7000 centipoises. Aliquots of the resin solution are withdrawn when the resin viscosity reaches 50, 100, 150, 200, 300, 500, 900, 1800, 5,000 and 7,000 centipoises. These aliquots are diluted with water to prepare 5% resin solutions and the solubility of the resin is observed. The solubility characteristics of the resin solutions are set forth in Table I.

*Table I*

| Resin Viscosity, Centipoises [1] | Characteristics of 5% Solution Of Resin In Water |
| --- | --- |
| 50 | Clear Solution. |
| 100 | Do. |
| 150 | Precipitate. |
| 200 | Do. |
| 300 | White Cloudy Suspension. |
| 500 | Do. |
| 900 | Blue White Stable Suspension. |
| 1,800 | Light Blue Haze. |
| 5,000 | Clear Solution. |
| 7,000 | Do. |

[1] In a 55% aqueous solution at 25° C.

EXAMPLE V

Three melamine-formaldehyde resins modified with varying amounts of sodium bisulfite are prepared. These resins are prepared by the procedure described in Example I except that the molar proportion of sodium bisulfite per mol of melamine included in the reaction mixture is adjusted to, respectively, 0.12, 0.14 and 0.19. The properties of the resins closely approximate those of the resin prepared in Example I.

The preparation of cationic resin colloids from the sulfite-modified, melamine-formaldehyde resins is illustrated in the subsequent examples.

EXAMPLE VI

A cationic resin colloid of the sulfite-modified, melamine-formaldehyde resin of Example I is prepared by dissolving 12 parts of the spray-dried resin of Example I in 88 parts of water, adding 6 parts of 37% hydrochloric acid thereto and aging the solution for 3 hours at 70° F. The resulting solution has a bluish cast and the resin particles carry a positive charge. The colloidal resin solution is diluted to 3% resin solids and does not undergo any measurable change in physical properties when stored for periods of up to at least 30 days.

EXAMPLE VII

Cationic resin colloids are prepared from the three sulfite-modified, melamine-formaldehyde resins described in Example V. The procedure for preparing the resin colloids is that described in Example VI. The properties of the products correspond to those of the product of Example VI.

EXAMPLE VIII

Cationic resin colloids are prepared from the sulfite-modified, melamine-formaldehyde resins of Example IV which have viscosities of, respectively, 500, 900, 1800, 5,000 and 7,000 centipoises. The products correspond in properties to the product of Example VI.

The products of Examples VI, VII and VIII develop high wet tensile strength in paper when the cationic resin colloids are added to the paper furnish at a concentration of 0.1–5.0 weight percent based on the paper-making fibers. In this regard attention is directed to my copending application Serial No. 586,656, filed of even date herewith wherein the employment of the cationic resin colloids in the manufacture of high wet tensile strength paper is described in detail.

The novel sulfite-modified, melamine-formaldehyde resins of this invention are prepared by reacting 1 molar proportion of melamine with 3.0–4.0 molar proportions of formaldehyde and 0.10–0.20 molar proportion of a water-soluble salt of sulfurous acid in an aqueous solution at a pH of at least 8.5 and preferably at least 9.0. An especially preferred class of resins is prepared by reacting 1 molar proportion of melamine with about 3.6 molar proportion of formaldehyde and 0.12–0.15 molar proportion of a water-soluble salt of sulfurous acid. The resins are polymerized until a 55% aqueous solution thereof at 25° C. has a viscosity of at least 300 centipoises and more especially at least about 500 centipoises or higher, e. g., above 1,000 centipoises.

The melamine employed in preparing the resins of this invention may be of regular commercial grade and no special purification is required. The formaldehyde employed ordinarily will be the 37% formalin solution of commerce although such solutions may be enriched in formaldehyde content by adding thereto formaldehyde polymers such as paraformaldehyde or trioxymethylene. The water-soluble salt of sulfurous acid employed in preparing the resins of this invention ordinarily will be an alkali metal bisulfite such as sodium bisulfite, potassium bisulfite, etc. or a progenitor thereof which hydrolyzes in water to yield a bisulfite, e. g., sodium sulfite, sodium metabisulfite, etc. Other water-soluble salts of sulfurous acid such as ammonium bisulfite also may be employed if desired.

A surprising feature of the sulfite-modified, melamine-formaldehyde resins of this invention is the relationship which exists between the resins' water sollubility and the resins' viscosity. As set forth in Example IV, the resins become water-insoluble in dilute aqueous solutions when they are polymerized to a viscosity of greater than 100 centipoises. Thereafter, the resins become increasingly more water-insoluble as the resins are further polymerized to higher viscosities. This is in accord with recognized scientific principles. Most surprisingly, however, the water-solubility of the resins undergoes an inversion when the resin is polymerized to a viscosity of about 300 centipoises. Thereafter, as the resins are further polymerized to higher viscosities, they become increasingly more water-soluble and remain water-soluble at viscosities of up to and including 7,000 centipoises. The reasons for this anomalous behavior are unknown.

The sulfite-modified, melamine-formaldehyde resins of this invention, because of their desirable combination of good resin properties, high viscosity and water-solubility, may be advantageously employed in water-base adhesive formulations, in the manufacture of resin-impregnated paper laminates, in textile finishing operations and in water-base surface coating compositions.

The water-soluble, high-viscosity, sulfite-modified, melamine-formaldehyde resins of this invention can be converted into highly valuable cationic resin colloids by treating aqueous solutions of such resins with strong acids and aging same. Such cationic resins may be either truly water-soluble or colloidally-dispersible. The term "water-dispersible" is used throughout this specification to denote both types of resins. Where the sulfite-modified, melamine-formaldehyde resins are to be converted into cationic resins, the molar proportions of the components included in the resin are slightly less critical than set forth earlier herein. For example, the resins converted into cationic resins may contain 2.5–4.5 mols of formaldehyde and up to 0.2 mol of sulfonate groups per mol of melamine. Preferably, however, such resins should contain 3.0–4.0 and more especially about 3.6 mols of formaldehyde and 0.10–0.18 mol and more especially 0.12–0.15 mol of sulfonate groups per mol of melamine. In no event can the resin contain more than about 0.2 mol of sulfonate groups per mol of melamine as such resins precipitate in strong acid solutions and cannot be redispersed in water.

As previously noted, such cationic resins are prepared by treating aqueous solutions of the sulfite-modified, melamine-formaldehyde resin with strong acid. For the development of optimum properties, the sulfite-modified, melamine-formaldehyde resin is dissolved or dispersed in water and the acid is added thereto. Alternatively, the resin can be added to a strong acid solution.

The quantity of acid employed in preparing the cationic resin colloids is sufficient to adjust the pH of the resin solution to the range of 0.5–3.5 and preferably 1.5–2.5. It is preferred to employ hydrochloric acid in the preparation of the cationic resin colloid, but other strong acids such as phosphoric acid, formic acid, etc. also may be employed if desired.

The properties of the cationic resins are affected by the length of time that the resins are aged in the acid solution. The resin particles will become positively charged within one hour in either dilute or concentrated resin solutions and are suitable for many purposes. For some purposes, however, particularly when the resin is to be employed in the manufacture of high wet tensile strength paper, further aging is required for the development of optimum resin properties. When the resin solution is dilute, i. e. contains less than 5% resin solids, 5–15 hours at room temperature are usually required for the development of optimum properties and little improvement is obtained by aging dilute resin solutions for longer periods. Such dilute resin solutions are very stable and can be stored for up to 30 days at room temperature without adversely affecting the properties of the cationic resin. In more concentrated resin solutions, i. e. those containing more than 10% resin solids, the desired properties of the resins develop more rapidly, usually within 3–5 hours at room temperature. Such concentrated resin solutions are relatively unstable, however, and after the cationic resin develops its maximum properties, on further aging, it loses certain of its desired properties and eventually forms a non-water dispersible precipitate. Such precipitates are usually formed after about 7 hours at room temperature. In a preferred procedure, the resin is aged about 3 hours at room temperature in a concentrated solution, e. g., at 10–15% resin solids, and thereafter is diluted to less than 5% resin solids and stored until used.

The cationic resins described above have utility as a binding resin in starch-clay paper coating compositions and as a beater additive in the rosin sizing of paper. Such cationic resin colloids are especially valuable in the manufacture of high wet strength paper as more fully described and claimed in my copending application Serial No. 586,656, filed of even date herewith.

The above descriptions and particularly the examples are set forth by way of illustration only. Many other variations and modifications thereof will be obvious to those skilled in the art and can be made without departing from the spirit and scope of the invention herein described.

What is claimed is:

1. An aqueous solution of a thermosetting colloidal, water-dispersed, acid-aged, cationic, sulfite-modified, melamine-formaldehyde resin having a pH of 0.5–3.5, said resin, before acid aging, containing 2.5–4.5 mols of formaldehyde and up to 0.2 mol of sulfonate groups per mol of melamine and having a viscosity of at least about 300 centipoises when measured in a 55% aqueous solution at 25° C.

2. A composition as in claim 1 wherein the sulfite-modified, melamine-formaldehyde resin contains 3.0–4.0 mols of formaldehyde and 0.10–0.18 mol of sulfonate groups per mol of melamine.

3. A composition as in claim 1 wherein the sulfite-modified, melamine-formaldehyde resin contains about 3.6 mols of formaldehyde and 0.12–0.15 mol of sulfonate groups per mol of melamine.

4. A method for preparing an aqueous solution of a thermosetting cationic resin colloid which comprises incorporating a sulfite-modified, melamine-formaldehyde resin in an aqueous solution having a pH of 0.5–3.5 and maintaining the resin in said solution for at least one hour, said resin, before acid aging, containing 2.5–4.5 mols of formaldehyde and up to 0.2 mol of sulfonate groups per mol of melamine and having a viscosity of at least about 300 centipoises when measured in a 55% aqueous solution at 25° C.

5. The method of claim 4 wherein the acid employed in the aqueous solution is hydrochloric acid.

6. The method of claim 4 wherein the sulfite-modified, melamine-formaldehyde resin contains 3.0–4.0 mols of formaldehyde and 0.10–0.18 mol of sulfonate groups per mol of melamine.

7. The method of claim 4 wherein the sulfite-modified, melamine-formaldehyde resin contains about 3.6 mols of formaldehyde and 0.12–0.15 mol of sulfonate groups per mol of melamine.

8. A method for preparing a thermosetting cationic resin colloid which comprises incorporating up to about 15 parts of a sulfite-modified, melamine-formaldehyde resin in 85 parts of water, adding sufficient hydrochloric acid thereto to adjust the pH of the solution to the range of 0.5–3.5 and maintaining the resin in the acid solution for at least 1 hour, said resin, before acid aging, containing 3.0–4.0 mols of formaldehyde and 0.10–0.18 mol of sulfonate groups per mol of melamine and having a viscosity of at least about 300 centipoises when measured in a 55% aqueous solution at 25° C.

References Cited in the file of this patent

UNITED STATES PATENTS

| | | |
|---|---|---|
| 2,407,599 | Auten et al. | Sept. 10, 1946 |
| 2,730,516 | Suen et al. | Jan. 10, 1956 |